United States Patent
Boening et al.

(10) Patent No.: US 9,664,063 B2
(45) Date of Patent: May 30, 2017

(54) TURBOCHARGER COMPRISING A FLOATING BUSH BEARING

(71) Applicant: CONTINENTAL AUTOMOTIVE GMBH, Hannover (DE)

(72) Inventors: Ralf Boening, Reiffelbach (DE); Ralph-Maurice Koempel, Mannheim (DE); Christian Schmidt, Muehltal (DE); Juergen Krottenthaler, Pemfling (DE); Stefan Reuter, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 200 days.

(21) Appl. No.: 14/404,700

(22) PCT Filed: May 24, 2013

(86) PCT No.: PCT/EP2013/060804
§ 371 (c)(1),
(2) Date: Dec. 1, 2014

(87) PCT Pub. No.: WO2013/178557
PCT Pub. Date: Dec. 5, 2013

(65) Prior Publication Data
US 2015/0147204 A1 May 28, 2015

(30) Foreign Application Priority Data

May 29, 2012 (DE) .................. 10 2012 208 966

(51) Int. Cl.
*F16C 23/10* (2006.01)
*F16C 17/18* (2006.01)
(Continued)

(52) U.S. Cl.
CPC ........... *F01D 25/166* (2013.01); *F01D 25/18* (2013.01); *F16C 17/18* (2013.01); *F16C 17/24* (2013.01);
(Continued)

(58) Field of Classification Search
CPC .... F01D 25/166; F16C 17/18; F16C 2360/24; F05D 2220/40; F04D 29/056; F04D 29/057
(Continued)

(56) References Cited

U.S. PATENT DOCUMENTS 3,680,932 A 8/1972 Raimondi
3,993,370 A * 11/1976 Woollenweber ...... F01D 25/166
384/287
(Continued)

FOREIGN PATENT DOCUMENTS

AT 232804 B 4/1964
DE 102007036913 A1 12/2010
(Continued)

*Primary Examiner* — Peter J Bertheaud
(74) *Attorney, Agent, or Firm* — Laurence A. Greenberg; Werner H. Stemer; Ralph E. Locher

(57) ABSTRACT

A turbocharger has an exhaust gas turbine, a fresh-air compressor and a bearing seat. A rotor shaft that is equipped with the turbine and the compressor wheel is rotatably mounted in the bearing seat by way of at least one radial bearing. The radial bearing is a floating bush bearing with a hollow-cylindrical floating bush body positioned between a bearing seat of the bearing housing and the rotor shaft. The floating bush body is provided with a defined imbalance in order to counteract an imbalance of the turbo rotor.

11 Claims, 5 Drawing Sheets

(51) Int. Cl.
  *F04D 29/05* (2006.01)
  *F01D 25/16* (2006.01)
  *F01D 25/18* (2006.01)
  *F16C 17/24* (2006.01)
  *F04D 29/057* (2006.01)
  *F04D 29/056* (2006.01)

(52) U.S. Cl.
  CPC .......... *F04D 29/056* (2013.01); *F04D 29/057* (2013.01); *F05D 2220/40* (2013.01); *F05D 2240/54* (2013.01); *F16C 2360/24* (2013.01)

(58) Field of Classification Search
  USPC .................................. 417/405–407; 384/901
  See application file for complete search history.

(56) References Cited

U.S. PATENT DOCUMENTS

| | | | | |
|---|---|---|---|---|
| 4,427,309 A * | 1/1984 | Blake | .................... | F01D 25/166 384/286 |
| 4,640,630 A * | 2/1987 | Yoshioka | .............. | F01D 25/164 384/129 |
| 4,902,144 A * | 2/1990 | Thoren | ................. | F01D 25/166 384/287 |
| 5,000,584 A * | 3/1991 | Simmons | .............. | B21B 31/074 384/114 |
| 5,480,234 A * | 1/1996 | Chen | ....................... | F16C 17/02 384/118 |
| 6,709,160 B1 * | 3/2004 | Ward | .................... | F01D 25/166 384/286 |
| 6,905,316 B2 * | 6/2005 | Parker | .................. | F01D 25/164 123/559.1 |
| 7,204,671 B2 * | 4/2007 | Dellmann | ............. | F01D 25/125 415/111 |
| 8,449,190 B2 * | 5/2013 | Larue | ...................... | F16C 27/02 384/119 |
| 8,790,066 B2 * | 7/2014 | Gutknecht | ............. | F01D 25/16 415/1 |
| 2009/0238689 A1 * | 9/2009 | Jamil | .................... | F01D 25/166 415/229 |
| 2013/0230263 A1 | 9/2013 | Aubele et al. | | |
| 2014/0010647 A1 | 1/2014 | Nishida et al. | | |

FOREIGN PATENT DOCUMENTS

| | | |
|---|---|---|
| DE | 102010040158 A1 | 3/2012 |
| EP | 1550812 A1 | 7/2005 |
| EP | 2085578 A2 | 8/2009 |
| JP | S50104044 U | 8/1975 |
| JP | S58142014 A | 8/1983 |
| JP | 2002213450 A | 7/2002 |
| JP | 2008111502 A | 5/2008 |
| JP | 2008190680 A | 8/2008 |
| WO | 2012132586 A1 | 10/2012 |

\* cited by examiner

TURBOCHARGER COMPRISING A FLOATING BUSH BEARING

BACKGROUND OF THE INVENTION

Field of the Invention

The invention relates to an exhaust-gas turbocharger, said exhaust-gas turbocharger having an exhaust-gas turbine and having a fresh-air compressor and having a turbo rotor with turbine wheel and compressor wheel fastened on a rotor shaft, wherein the rotor shaft is rotatably mounted in a bearing receptacle by means of a floating-bushing bearing.

Exhaust-gas turbochargers are increasingly used in motor vehicle internal combustion engines for the purpose of increasing power. This is ever more commonly implemented with the aim of reducing the size and weight of the internal combustion engine while maintaining the same power or even increasing power, and at the same time reducing fuel consumption and thus $CO_2$ emissions in view of ever more stringent legal regulations in this regard. The operating principle consists in utilizing the energy contained in the exhaust-gas flow to increase the pressure in the intake tract of the internal combustion engine and thus effect improved charging of the combustion chamber with atmospheric oxygen, and thus be able to convert more fuel, gasoline or diesel, per combustion process, that is to say increase the power of the internal combustion engine.

For this purpose, an exhaust-gas turbocharger has an exhaust-gas turbine, which is arranged in the exhaust tract of the internal combustion engine and which has a turbine wheel driven by the exhaust-gas flow and arranged in a turbine housing, and a fresh-air compressor, which is arranged in the intake tract and which has a compressor wheel arranged in a compressor housing, which compressor wheel builds up the pressure. The turbine wheel and compressor wheel are fastened rotationally conjointly to the opposite ends of a rotor shaft and thus form the rotary unit, referred to here as turbo rotor, of the exhaust-gas turbocharger. The rotor shaft is rotatably mounted in a bearing unit arranged between exhaust-gas turbine and fresh-air compressor. Thus, the turbine wheel, and via the rotor shaft also the compressor wheel, are driven by way of the exhaust-gas mass flow, and the exhaust-gas energy is thus utilized for building up pressure in the intake tract.

During operation, the turbine wheel is situated in the hot exhaust-gas flow and is thus exposed to very large temperature fluctuations, with peak temperatures of up to over 1000° C. being reached. At the same time, the turbine rotor rotates at very high rotational speeds of up to 300,000 rpm, whereby the turbine wheel, compressor wheel and in particular the bearing arrangement of the rotor shaft are subjected to very high mechanical and thermal loads.

To accommodate the bearing unit, a bearing housing is generally arranged between the exhaust-gas turbine and the fresh-air compressor, which bearing housing may be either formed as a separate unit or formed as a unit with the turbine housing and/or the compressor housing. In the bearing housing there are provided one or more bearing receptacles in which the required bearings are arranged. For the mounting of the rotor shaft, so-called floating-bushing bearings, as radial bearings, are well proven under the conditions mentioned above. An example of the arrangement of such radial bearings within a bearing housing of an exhaust-gas turbocharger is illustrated in FIG. 1, which shows an overall construction of a conventional exhaust-gas turbocharger in a simplified illustration.

FIG. 1 shows, in a simplified sectional illustration, the basic construction of a known exhaust-gas turbocharger 101, composed substantially of an exhaust-gas turbine 102, a fresh-air compressor 103 and an interposed bearing housing 104. In a bearing receptacle of the bearing housing 104 there are arranged two radial bearings 105/106, in which the rotor shaft 8 is mounted so as to be rotatable about the rotor axis 107. The turbine wheel 108, arranged in the turbine housing 109, is mounted rotationally conjointly on the rotor shaft 8 at one side, and the compressor wheel 110, arranged in the compressor housing 111, is mounted rotationally conjointly on the rotor shaft at the other side. The bearing housing 104 has an oil duct 104a through which oil for lubrication can be supplied to the radial bearings (105/106). The exhaust-gas turbine 102 has a wastegate device 112, and the fresh-air compressor 103 has an overrun air recirculation device 113. The exhaust-gas mass flow AM and the fresh-air mass flow FM are each indicated by arrows.

The construction and mode of operation of a floating-bushing bearing is presented on the basis of the illustration in FIG. 2. FIG. 2 shows a cross-sectional illustration, on an exaggerated scale, of a floating-bushing bearing of said type. In said illustration, between a rotating rotor shaft 8, which rotates at a rotational speed $n_W$, and a bearing receptacle 10 of the bearing housing 104, there is provided a likewise rotating floating bushing body 1, which rotates at a rotational speed $n_B$. Between the bearing receptacle 10 and the floating bushing body 1 there is provided an outer lubrication gap 9, which is filled with lubricating oil. Between the floating bushing body 1 and the rotor shaft 8 there is formed an inner lubrication gap 11, which is likewise filled with lubricating oil. The lubricating oil is supplied to the outer lubrication gap 9 through an oil duct 104a provided in the housing 10. Furthermore, in the floating bushing body 1, there are provided passage bores 2 through which lubricating oil is supplied to the inner lubrication gap 11 from the outer lubrication gap 9. By way of said lubricating oil films, the rotor shaft 10 slides on the internal diameter of the floating bushing body 1 and the floating bushing body 1 slides on the internal diameter of the bearing receptacle 10 of the housing 104. Here, the lubricating oil films must accommodate inter alia the radial forces that arise during operation.

In relation to a static plain bearing, a floating-bushing bearing has, aside from numerous advantages, the disadvantage that, when the rotor shaft rotates at a high rotational speed $n_W$ during operation, even minor imbalances of the turbo rotor can result in instabilities of the floating-bushing bearing which have the effect of shortening the service life and, in the worst case, can even lead to complete destruction of the floating-bushing bearing.

To reduce such instabilities of the floating-bushing bearing and thus lengthen the service life of the exhaust-gas turbocharger, it is attempted in practice to counteract this problem through the best possible balancing of the turbo rotor over the entire rotational speed range. Such attempts have however not yet led to the desired result with acceptable outlay, in particular for the range of elevated rotational speeds of turbo rotors, such as are encountered in particular in the case of relatively new designs of exhaust-gas turbochargers.

BRIEF SUMMARY OF THE INVENTION

It is therefore the object of the invention to specify an exhaust-gas turbocharger with floating-bushing bearing for a turbo rotor, in the case of which, over the entire expected rotational speed range of the rotor shaft, an occurrence of instabilities of the floating-bushing bearing is eliminated or at least reduced, and thus the operational reliability and service life of the exhaust-gas turbocharger are increased.

Said object is achieved by means of an exhaust-gas turbocharger having features as follows. Advantageous refinements of the invention are specified in the dependent claims.

According to the present invention, there is proposed an exhaust-gas turbocharger having an exhaust-gas turbine with a turbine wheel, having a fresh-air compressor with a compressor wheel, and having a bearing receptacle, wherein the turbine wheel and the compressor wheel are arranged on a common rotor shaft and thus form a turbo rotor. The rotor shaft is rotatably mounted in the bearing receptacle by means of at least one radial bearing in the form of a floating-bushing bearing. Here, the at least one radial bearing has a floating bushing body which is formed in the manner of a hollow cylinder with an internal diameter which receives the rotor shaft and with an external diameter by which the floating bushing body is received in the bearing receptacle. An inner lubrication gap is formed between the rotor shaft and the internal diameter of the floating bushing body and an outer lubrication gap is formed between the bearing receptacle and the outer diameter of the floating bushing body. The exhaust-gas turbocharger according to the invention is characterized in that the floating bushing body is provided with a defined imbalance with respect to its axis of rotation, which imbalance counteracts, in stabilizing fashion, an imbalance of the turbo rotor during operation.

Here, the imbalance is in relation to the axis of rotation of the floating bushing body, said axis of rotation being identical to the longitudinal axis, arranged centrally with respect to the outer diameter, of the floating bushing body, wherein, in the case of a concentric arrangement of the internal diameter and a uniform design of the inner lubrication gap over the circumference, said longitudinal axis coincides with the axis of rotation of the shaft. Here, the defined imbalance is specified in advance both in terms of its position in relation to the floating bushing body and also in terms of magnitude. The determination of the required magnitude and of the advantageous position of the imbalance can be performed in advance mathematically, by computer simulation or in corresponding series of tests.

The cause of an imbalance lies in a non-uniform mass distribution of the rotary body, in this case of the floating bushing body, over its circumference in relation to its structurally predefined axis of rotation. The non-uniform mass distribution results in a deviation of the position of the axis of inertia of the rotary body in relation to its predefined axis of rotation. Said position deviation can be taken into consideration as a measure for the value, that is to say the magnitude of the imbalance, and is also referred to as eccentricity. Here, the eccentricity indicates the deviation, in terms of magnitude, of the position of the axis of inertia of a rotary body in relation to its axis of rotation, for example in millimeters (mm).

Accordingly, in one advantageous embodiment, the floating bushing body of the exhaust-gas turbocharger according to the invention is characterized in that the defined imbalance, expressed as an eccentricity in relation to the bearing play of the inner lubrication gap, lies in a range between 15% and 35%, in particular 20% to 30%, of the bearing play formed by the inner lubrication gap. Here, the bearing play is defined as twice the gap width of the inner lubrication gap with concentric arrangement of the shaft in the floating bushing body. In a specific exemplary embodiment, there is an encircling inner lubrication gap of 0.011 mm, and thus the bearing play is 0.022 mm. In this example, it would thus be necessary to provide an eccentricity of 0.0033 mm to 0.0077 mm.

In a further advantageous embodiment of the exhaust-gas turbocharger according to the invention, the floating bushing body is characterized in that the defined imbalance, expressed as an eccentricity, lies in a range from 0.003 mm to 0.008 mm, and is in particular 0.005 mm.

The ranges specified in the two abovementioned examples for the dimensioning of the imbalance have proven to be particularly advantageous in tests with rotor shafts in a diameter range between 8 mm and 25 mm, because the defined imbalance of the floating bushing body is on the one hand small enough so as not to have an adverse effect on the smooth running of the overall system, but is on the other hand large enough to counteract the imbalance of the shaft over the entire rotational speed range, in particular also in the range of high rotational speeds of up to 250,000 rpm and beyond.

There are various possibilities for implementing the defined imbalance of the floating bushing body. For example, the imbalance may be formed by one, two or more stepped bores formed into the floating bushing body. Alternatively, the defined imbalance may also be formed by one or more passage bores or blind bores formed into the floating bushing body, by an internal groove formed into the floating bushing body, or by a deformation of the outer shell of the floating bushing body. The defined imbalance may also be formed by virtue of the internal diameter of the floating bushing body being arranged eccentrically with respect to the external diameter of the floating bushing body.

The abovementioned options for producing a defined imbalance may, depending on requirements, be used either alternatively or in combination. The defined imbalance formed into the floating bushing body counteracts an imbalance of the turbo rotor during operation of the exhaust-gas turbocharger. In this way, even in the range of high rotational speeds of the rotor shaft, possible instabilities of the floating-bushing bearing are eliminated or at least greatly reduced. This advantageously has the effect that the probability of destruction of the floating-bushing bearing is also reduced, and thus conversely, the operational reliability and service life of the exhaust-gas turbocharger are increased.

BRIEF DESCRIPTION OF THE SEVERAL VIEWS OF THE DRAWING

Exemplary embodiments of the invention will be explained below on the basis of FIGS. 2-7. In the figures.

Objects or functional units of identical function and designation are denoted by the same reference signs throughout the figures.

DESCRIPTION OF THE INVENTION

Figure 1:
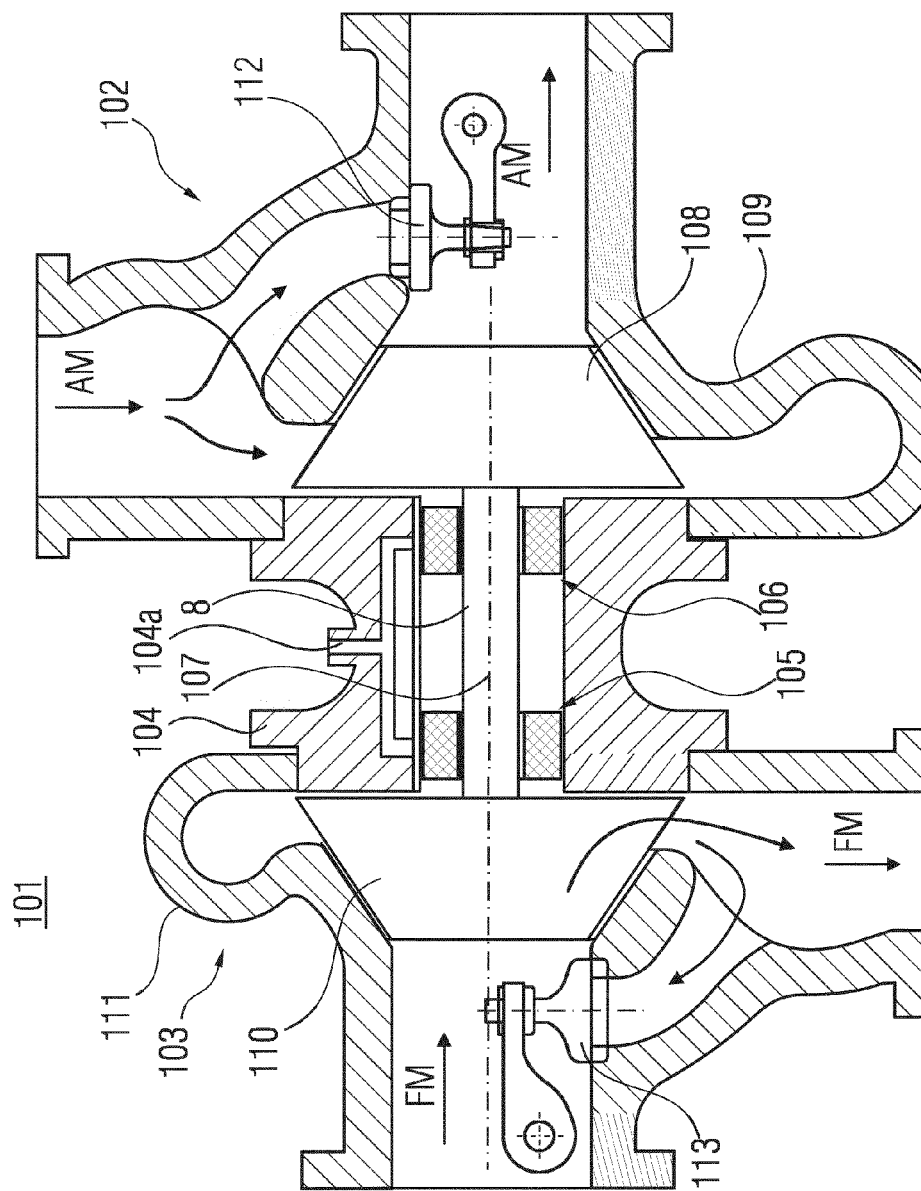
FIG. 1 is a simplified sectional illustration of an exhaust-gas turbocharger with two radial bearings for the mounting of the rotor shaft, in a side view.
Figure 2:
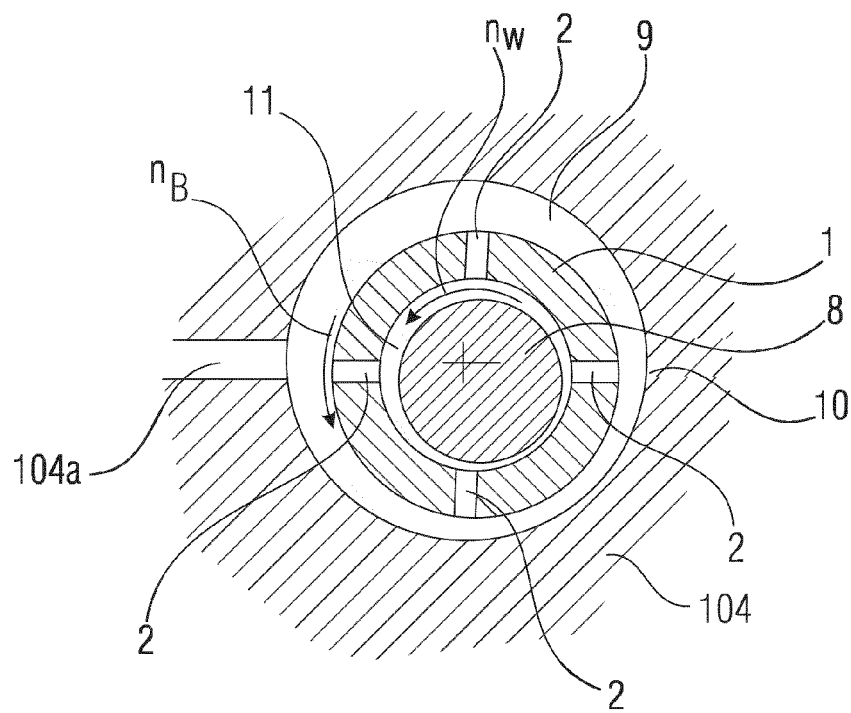
FIG. 2 is a simplified cross-sectional illustration, on a greatly exaggerated scale, of a floating-bushing bearing according to the prior art.
Figure 3:
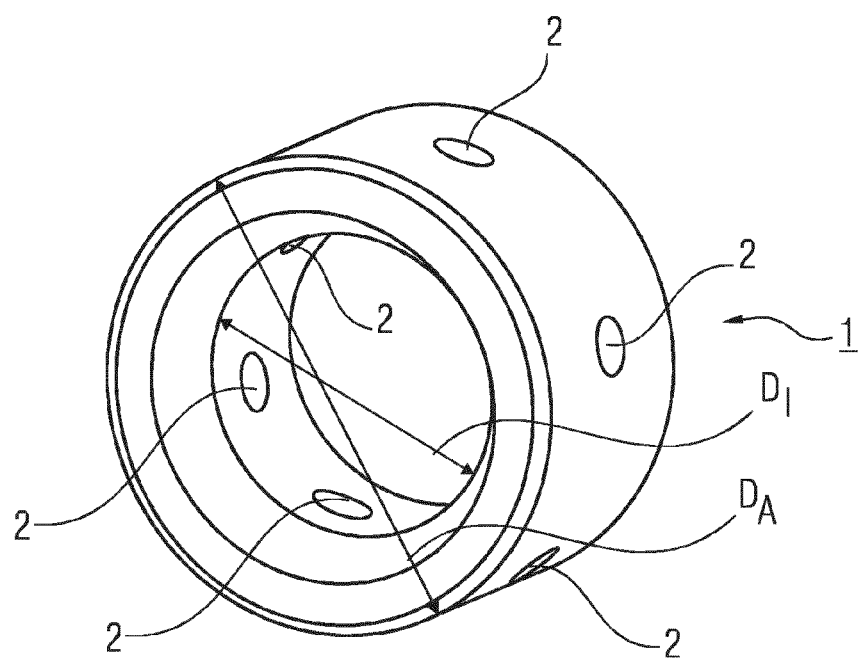
FIG. 3 is a perspective diagram of a conventional floating bushing body.

FIG. 3 shows a perspective diagram of a conventional floating bushing body 1. Said floating bushing body 1 is of substantially hollow cylindrical or tubular form with an external diameter $D_A$ and an internal diameter $D_I$, and has multiple oil supply bores 2 which are arranged in uniformly distributed fashion over its circumference and through which, during operation, lubricating oil is transported from the outer side to the inner side, that is to say from the outer lubrication gap to the inner lubrication gap. Said oil supply bores 2 generally each run in a radial direction, each have a predefined diameter, and are implemented as passage bores. The floating bushing body 1 illustrated in FIG. 2 is of symmetrical construction and does not have a deliberate imbalance.

Figure 4:
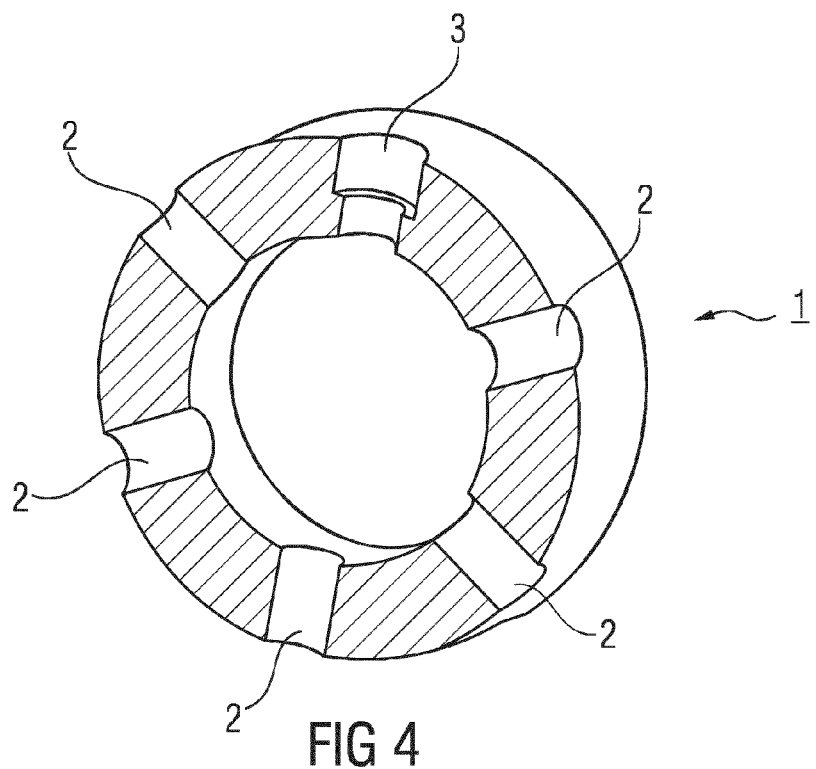
FIG. 4 is a sectional illustration of a floating bushing body, the imbalance of which is formed by a stepped bore.

FIG. 4 shows a sectional illustration of a floating bushing body 1 whose imbalance is formed by a stepped bore formed into the floating bushing body 1. This floating bushing body 1, too, is of substantially hollow cylindrical or tubular form. It has a total of six oil supply bores 2, 5 of which are denoted by the reference sign 2, and one of which is denoted by the reference sign 3. Said oil supply bore 3 serves simultaneously for the generation of the imbalance of the floating bushing body. Said oil supply bore is of stepped form for this purpose, wherein it has, in its radially outer region, a diameter that is larger than the diameter of the same bore in its radially inner region. The diameter of the bore 3 in its radially inner region corresponds to the diameter of each of the bores 2. The diameter of the bore 3 in its radially outer region is larger than the diameter of the bore 3 in its radially inner region, and is thus also larger than the diameter of the bores 2. This yields an intentionally non-uniform mass distribution of the floating bushing body over the circumference, and thus an imbalance which is defined in terms of magnitude and position.

The imbalance of the floating bushing body realized in the form of a stepped bore 3 counteracts an imbalance of the shaft over the entire rotational speed range of the shaft, in particular also in the range of high rotational speeds, during the operation of the radial bearing, such that instabilities of the radial bearing, and the probability of destruction of the bearing, are reduced.

Figure 5:
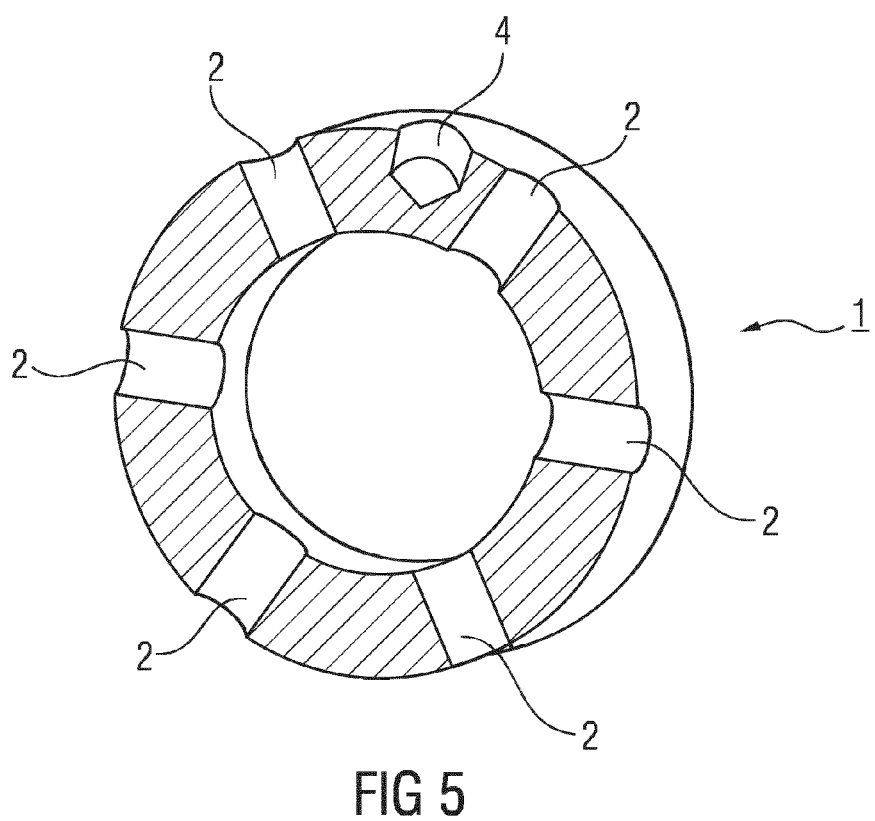
FIG. 5 is a sectional illustration of a floating bushing body, the imbalance of which is formed by a blind bore.

FIG. 5 shows a sectional illustration of a floating bushing body whose imbalance is formed by at least one blind bore 4 formed into the outer circumference of the floating bushing body. Said floating bushing body 1, too, is of substantially hollow cylindrical or tubular form. It has a total of six oil supply bores 2 formed so as to be distributed uniformly over the circumference. The blind bore 4 serves for generating the imbalance of the floating bushing body. The blind bore 4 may in principle have the same diameter as the oil supply bores 2, which permits production in the same working step using the same tool. However, the blind bore 4 may also have a diameter that differs from the oil supply bores 2, should this be necessary for the purpose of removing an adequate amount of material in order to define the imbalance. This, too, results in an intentionally non-uniform mass distribution of the floating bushing body over the circumference, and thus an imbalance which is defined in terms of magnitude and position.

The imbalance of the floating bushing body realized in the form of a blind bore 4 counteracts an imbalance of the shaft over the entire rotational speed range of the shaft, in particular also in the range of high rotational speeds, during the operation of the radial bearing, such that instabilities of the radial bearing, and the probability of destruction of the bearing, are reduced.

Figure 6:
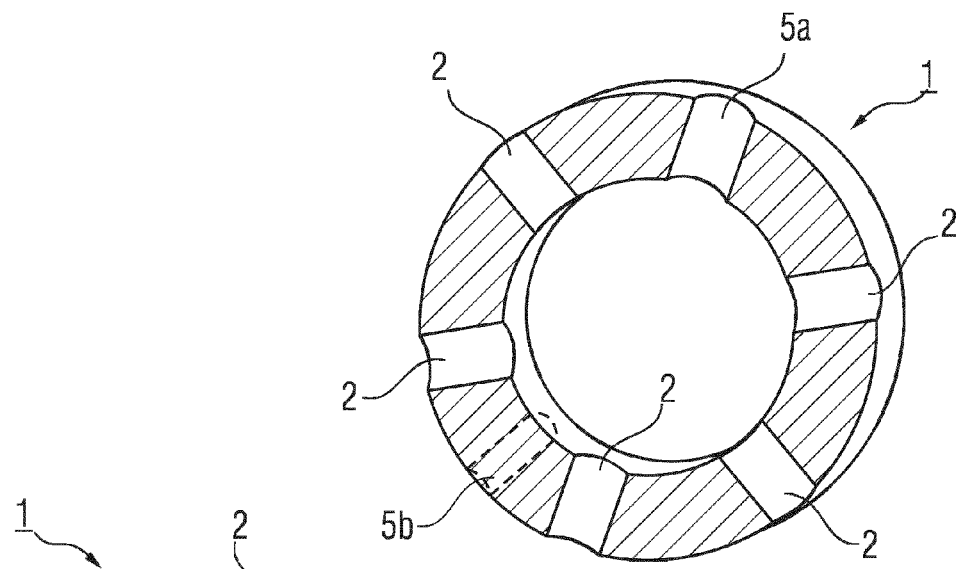
FIG. 6 is a sectional illustration of a floating bushing body, the imbalance of which is formed by a passage bore.

FIG. 6 shows a sectional illustration of a floating bushing body whose imbalance is formed by a passage bore formed into the floating bushing body. Said floating bushing body 1, too, is of substantially hollow cylindrical or tubular form. It has a total of six oil supply bores formed so as to be distributed uniformly over the circumference, 5 of which are denoted by the reference sign 2, and one of which is denoted by the reference sign 5a. Said oil supply bore 5a serves simultaneously for generating the imbalance of the floating bushing body. Said oil supply bore is for this purpose in the form of a passage bore, the diameter of which is constant and is larger, throughout, than the diameter of the other bores 2. A corresponding result may alternatively also be achieved through the arrangement of an additional passage bore 5b (indicated by dashed lines) between the uniformly distributed oil supply bores 2. These two alternatives also result in an intentionally non-uniform mass distribution of the floating bushing body over the circumference, and thus an imbalance which is defined in terms of magnitude and position.

The imbalance of the floating bushing body realized in the form of a passage bore 5a/5b counteracts an imbalance of the shaft over the entire rotational speed range of the shaft, in particular also in the range of high rotational speeds, during the operation of the radial bearing, such that instabilities of the radial bearing, and the probability of destruction of the bearing, are reduced.

Figure 7:
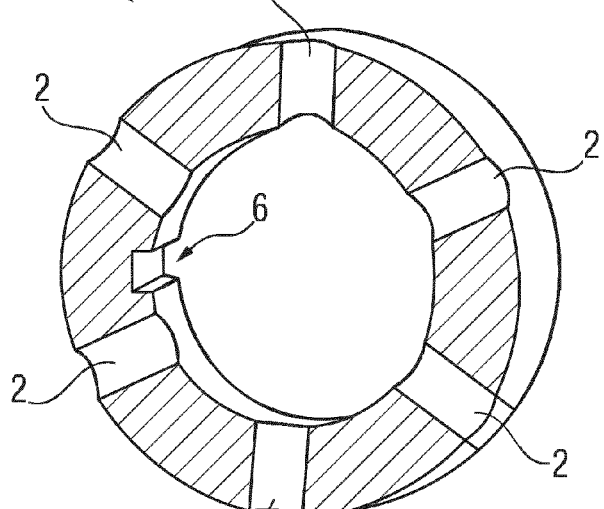
FIG. 7 is a sectional illustration of a floating bushing body, the imbalance of which is formed by an internal groove.

FIG. 7 shows a sectional illustration of a floating bushing body 1 whose imbalance is formed by an internal groove 6 formed into the floating bushing body 1. Said floating bushing body 1, too, is of substantially hollow cylindrical or tubular form. It has a total of six oil supply bores which are formed so as to be distributed uniformly over the circumference, are denoted by the reference sign 2, and are of corresponding diameter. Furthermore, the floating bushing body 1 has a targetedly dimensioned internal groove 6 on its inner side. This, too, results in an intentionally non-uniform mass distribution of the floating bushing body 1 over the circumference, and thus an imbalance which is defined in terms of magnitude and position. The same result may self-evidently be achieved through the arrangement of a corresponding external groove on the outer circumference of the floating bushing body 1 (not illustrated).

The imbalance of the floating bushing body 1 realized in the form of an internal groove 6 or external groove counteracts an imbalance of the shaft over the entire rotational speed range of the shaft, in particular also in the range of high rotational speeds, during the operation of the radial bearing, such that instabilities of the radial bearing, and the probability of destruction of the bearing, are reduced.

Figure 8:
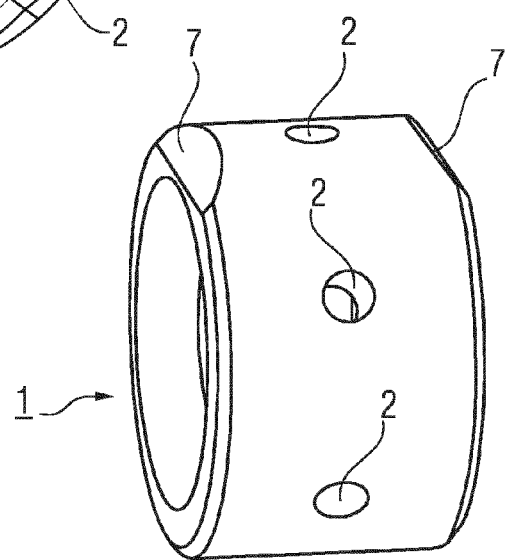
FIG. 8 is a perspective diagram of a floating bushing body, the imbalance of which is formed by a deformation of the outer shell of the floating bushing body.

FIG. 8 shows a perspective diagram of a floating bushing body 1 whose imbalance is formed by a deformation of the outer shell of the floating bushing body 1. Said floating bushing body 1, too, is of substantially hollow cylindrical or tubular form. It likewise has a total of six oil supply bores 2 which are formed so as to be distributed uniformly over the circumference and which have corresponding diameters. The deformation of the outer shell of the floating bushing body 1 may for example be realized by removal of material so as to form one or more beveled portions 7 or flattened portions.

These features, which may be used alternatively or in addition to one another, also result in an intentionally non-uniform mass distribution of the floating bushing body 1 over the circumference, and thus an imbalance which is defined in terms of magnitude and position.

The imbalance of the floating bushing body 1 realized by way of a deformation of the outer shell of the floating bushing body 1 counteracts an imbalance of the shaft over the entire rotational speed range of the shaft, in particular also in the range of high rotational speeds, during the operation of the radial bearing, such that instabilities of the floating-bushing bearing, and the probability of destruction of the bearing, are reduced.

Figure 9:
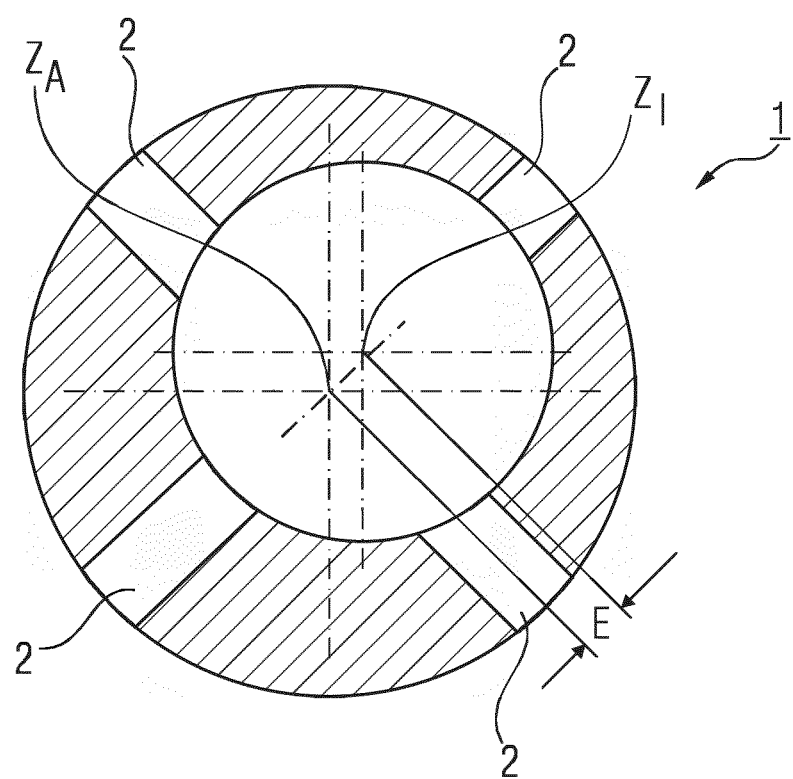
FIG. 9 shows, in a sectional illustration, a front view of a floating bushing body whose imbalance is formed by the eccentric arrangement of the external diameter of the floating bushing body with respect to the internal diameter of the floating bushing body.

FIG. 9 shows, in a sectional illustration, a front view of a floating bushing body 1 whose imbalance is formed by way of the eccentric arrangement of the internal diameter of the floating bushing body 1 with respect to the external diameter of the floating bushing body 1. For reasons of clarity, the relative position deviation E between the center $Z_I$ of the internal diameter and the center $Z_A$ of the external diameter has been illustrated on a greatly exaggerated scale. This measure, too, results in an intentionally non-uniform mass distribution of the floating bushing body 1 over the circumference and thus an imbalance which is defined in terms of magnitude and position.

A floating bushing body 1 provided with a defined imbalance as shown in FIGS. 4 to 9 and described above is a constituent part of a floating-bushing bearing which serves for the rotatable mounting of a rotor shaft 8 in an exhaust-gas turbocharger housing, wherein the floating bushing body 1 is arranged between a bearing receptacle 10 of the exhaust-gas turbocharger housing and the rotor shaft 8, wherein an inner lubrication gap is formed between the rotor shaft 8 and the floating bushing body 1 and an outer lubrication gap is formed between the floating bushing body and the bearing receptacle.

During the operation of the exhaust-gas turbocharger, in particular at high rotational speeds of the rotor shaft, an imbalance of the turbo rotor exerts a force impulse on the lubricating film in the inner lubrication gap. Said force impulse is dampened to a certain extent by the lubricant situated in the inner lubrication gap. The remaining residual impulse is transmitted, via the lubricant flow in the inner lubrication gap, to the floating bushing body, and basically causes a deflection of the floating bushing body relative to the lubricating film in the outer lubrication gap. The mass inertia of the floating bushing body itself and also damping forces of the lubricating film in the outer lubrication gap counteract said deflection of the floating bushing body, and effect partial compensation of the deflection of the floating bushing body. If the floating bushing body is provided with a defined imbalance—as explained above on the basis of FIGS. 4 to 9—then the stated counteraction is intensified, such that the undesired effects of imbalances of the turbo rotor are substantially compensated in particular also in the range of high rotational speeds of the rotor shaft, which lie in the range of up to 120 m/s.

To determine the location or locations on the floating bushing body at which a defined imbalance must be provided in order to be able to counteract an imbalance of the turbo rotor, tests are performed over the entire rotational speed range of the rotor shaft in order to determine what positions on the floating bushing body must be equipped with an imbalance in order to be able to counteract an imbalance of the turbo rotor.

The invention claimed is:

1. An exhaust-gas turbocharger, comprising:
a common rotor shaft, an exhaust-gas turbine with a turbine wheel mounted on said rotor shaft, and a fresh-air compressor with a compressor wheel mounted on said rotor shaft;
said rotor shaft with said turbine wheel and said compressor wheel together forming a turbo rotor;
at least one radial bearing rotatably mounting said rotor shaft in a bearing housing;
said at least one radial bearing being a floating-bushing bearing having a floating bushing body formed as a hollow cylinder with an inner diameter for receiving said rotor shaft and with an outer diameter by which said floating bushing body is received in a bearing receptacle, wherein an inner lubrication gap is formed between said rotor shaft and said inner diameter of said floating bushing body and an outer lubrication gap is formed between a bearing receptacle and said outer diameter; and
said floating bushing body being formed with a defined imbalance with respect to an axis of rotation, said imbalance counteracting, in a stabilizing fashion, an imbalance of said turbo rotor during operation;
wherein said defined imbalance of said floating bushing body is at least partially formed by an eccentricity indicating a deviation between a position of an axis of inertia of said floating bushing body in relation to an axis of rotation of said floating bushing body, said eccentricity amounting to between 0.003 mm and 0.008 mm.

2. The exhaust-gas turbocharger according to claim 1, wherein said eccentricity amounts to substantially 0.005 mm.

3. The exhaust-gas turbocharger according to claim 1, wherein said defined imbalance of said floating bushing body is partially formed by at least one stepped bore formed into said floating bushing body.

4. The exhaust-gas turbocharger according to claim 1, wherein said defined imbalance of said floating bushing body is partially formed by at least one blind bore formed into said floating bushing body.

5. The exhaust-gas turbocharger according to claim 1, wherein said defined imbalance of said floating bushing body is partially formed by a through-bore formed into said floating bushing body.

6. The exhaust-gas turbocharger according to claim 5, wherein said floating bushing body has a plurality of oil supply bores formed therein, and said through-bore partially forming said defined imbalance is an oil supply bore having a diameter larger than a diameter of other said oil supply bores.

7. The exhaust-gas turbocharger according to claim 5, wherein said through-bore is a through-bore provided in addition to oil supply bores formed in said floating bushing body.

8. The exhaust-gas turbocharger according to claim 1, wherein said defined imbalance of said floating bushing body is partially formed by an internal groove formed into said floating bushing body, wherein said internal groove does not form part of a through-bore formed into said floating bushing body.

9. The exhaust-gas turbocharger according to claim 1, wherein said defined imbalance of said floating bushing body is partially formed by a deformation of an outer shell of said floating bushing body, wherein said deformation does not form part of a through-bore formed into said floating bushing body.

10. The exhaust-gas turbocharger according to claim 9, wherein said deformation is formed by a removal of material from said outer shell of said floating bushing body.

11. An exhaust-gas turbocharger, comprising:
- a common rotor shaft, an exhaust-gas turbine with a turbine wheel mounted on said rotor shaft, and a fresh-air compressor with a compressor wheel mounted on said rotor shaft;
- said rotor shaft with said turbine wheel and said compressor wheel together forming a turbo rotor;
- at least one radial bearing rotatably mounting said rotor shaft in a bearing housing;
- said at least one radial bearing being a floating-bushing bearing having a floating bushing body formed as a hollow cylinder with an inner diameter for receiving said rotor shaft and with an outer diameter by which said floating bushing body is received in a bearing receptacle, wherein an inner lubrication gap is formed between said rotor shaft and said inner diameter of said floating bushing body and an outer lubrication gap is formed between a bearing receptacle and said outer diameter; and
- said floating bushing body being formed with a defined imbalance with respect to an axis of rotation, said imbalance counteracting, in a stabilizing fashion, an imbalance of said turbo rotor during operation;
- wherein said defined imbalance of said floating bushing body is an eccentric arrangement of said inner diameter of said floating bushing body in relation to said outer diameter of said floating bushing body.

* * * * *